(12) United States Patent
Gu et al.

(10) Patent No.: US 8,762,187 B2
(45) Date of Patent: Jun. 24, 2014

(54) EASY PROCESS MODELING PLATFORM

(75) Inventors: Jing Gu, Shanghai (CN); Dong Wang, Beijing (CN); Yang Wang, Shanghai (CN)

(73) Assignee: SAP AG, Walldorf (DE)

( * ) Notice: Subject to any disclaimer, the term of this patent is extended or adjusted under 35 U.S.C. 154(b) by 28 days.

(21) Appl. No.: 13/293,965

(22) Filed: Nov. 10, 2011

(65) Prior Publication Data

US 2013/0060596 A1   Mar. 7, 2013

(30) Foreign Application Priority Data

Sep. 6, 2011   (CN) .......................... 2011 1 0262652

(51) Int. Cl.
*G06Q 10/00*   (2012.01)

(52) U.S. Cl.
USPC ........................................................ 705/7.11

(58) Field of Classification Search
USPC ........................................................ 705/7.11
See application file for complete search history.

(56) References Cited

U.S. PATENT DOCUMENTS

| | | | | |
|---|---|---|---|---|
| 7,246,144 B2* | 7/2007 | Walsh et al. | .................. | 709/200 |
| 8,250,205 B2* | 8/2012 | Ishizawa et al. | .............. | 709/224 |
| 8,275,647 B2* | 9/2012 | Anisimov et al. | ............ | 705/7.27 |
| 8,356,075 B2* | 1/2013 | Balko | ............................ | 709/204 |
| 2005/0114201 A1* | 5/2005 | Walsh et al. | .................... | 705/10 |
| 2006/0074731 A1* | 4/2006 | Green et al. | ...................... | 705/8 |
| 2010/0161362 A1* | 6/2010 | Shapira et al. | .................... | 705/7 |

OTHER PUBLICATIONS

Huang et al (Design and Implementation of a Business Process Rules Engine), Jan. 2007, Center for Technology Management Research Howe School of Technology Management Stevens Institute of Technology, pp. 1-21.*
White "Process Modeling Notations and Workflow Patterns", Mar. 2004,BPTrends, pp. 1-24.*
NixCraft "Understanding Routing Table", Feb. 2008. pp. 1-6.*
IBM "Patterns: Implementing an SOA Using an Enterprise Service Bus", Jul. 2004, International Technical Support Organization, pp. 1-364.*
nixCraft "Understanding Routing Table", Mar. 2008, Linux FAQ / Howtos, p. 1-7.*

* cited by examiner

*Primary Examiner* — Romain Jeanty
(74) *Attorney, Agent, or Firm* — Fish & Richardson P.C.

(57) ABSTRACT

The present disclosure describes methods, systems, and computer program products for generic process modeling. One method includes identifying a business process for execution, the business process defined by one or more process steps, identifying a process routing table associated with the identified business process, at least a portion of the process routing table including one or more entries defining a set of business process rules for the identified business process, identifying a particular entry in the process routing table associated with a current state of the identified business process; and performing at least one action defined by the identified particular entry in the process routing table. In some instances, at least one entry in the process routing table is associated with one of a plurality of process patterns, with each process pattern comprising a reusable, predefined operation.

19 Claims, 10 Drawing Sheets

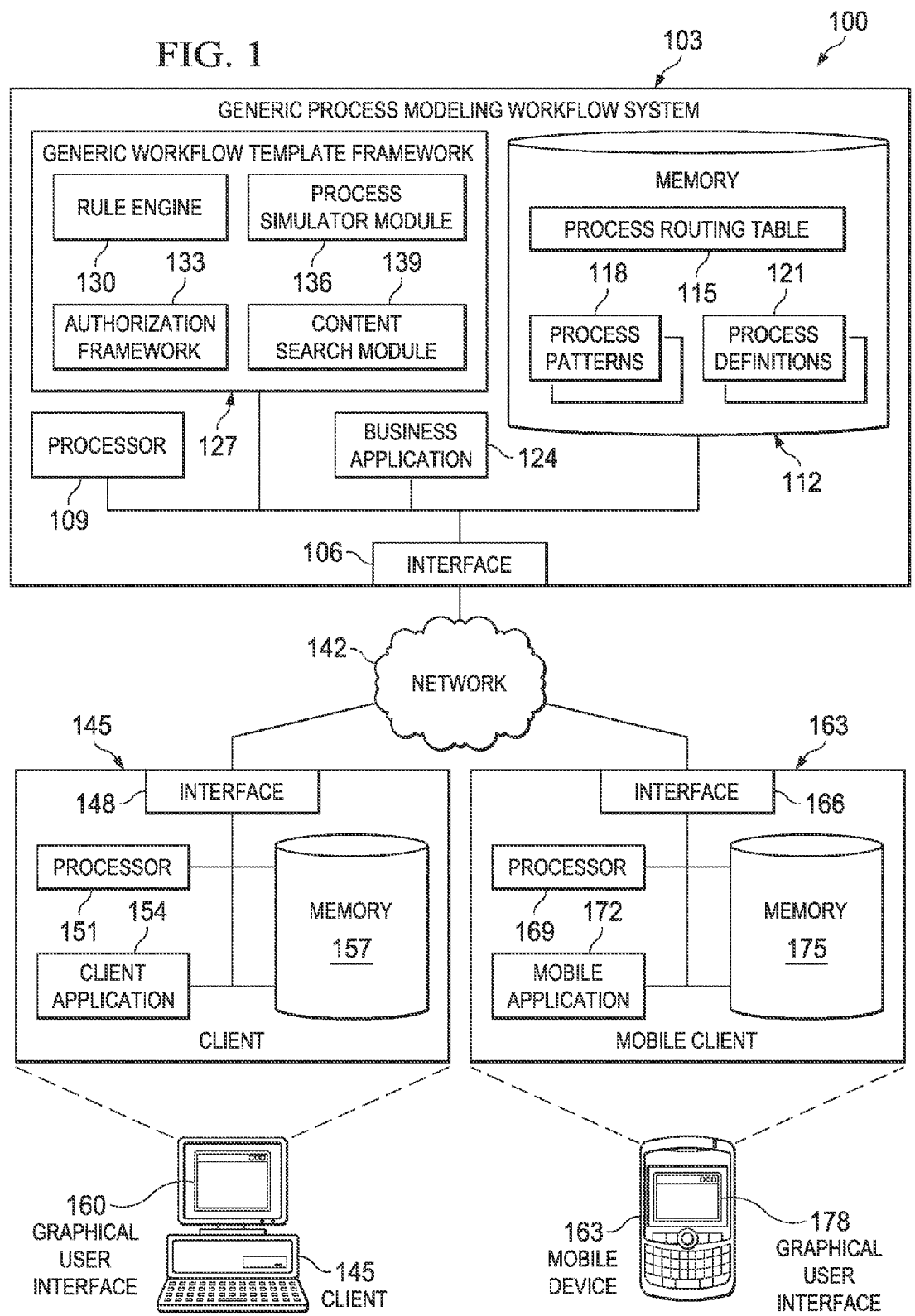

| PRODUCT | AMOUNT | => APPROVER | APPROVER LEVEL? |
|---|---|---|---|
| LCD TELEVISIONS | <5000 | SALES MANAGER | 1 |
| LCD TELEVISIONS | >=5000 | SALES DIRECTOR | 1 |
| CAMERA | <5000 | SALES MANAGER | 1 |
| CAMERA | >=5000 | SALES DIRECTOR | 1 |
| CAMERA | >=10000 | FINANCE TEAM | 2 |

| PROCESSOR_ROLE | DELEG_METHOD |
|---|---|
| /EDM/MAT_SUPERVISOR | |
| /EDM/MAT_ADMIN | |
| | /EDM/CL_AGT_GET_INITIATOR |
| | /EDM/CL_BG_PUSH_TO_SAP |
| /EDM/MAT_ADMIN | |
| | /EDM/CL_AGT_GET_INITIATOR |
| | |
| | /EDM/CL_AGT_GET_INITIATOR |
| | /EDM/CL_BG_PUSH2SAP_CUSTOMER |
| | |
| | /EDM/CL_AGT_GET_INITIATOR |
| /EDM/CUS_ADMIN | |
| | /EDM/CL_AGT_GET_ADHOC_AGENT |

FIG. 5B-2

| SET_REQUEST_STAT 545 | SUCC_WF_ACTIVITY 550 | NOTIF_TYPE 555 |
|---|---|---|
| 02 NEED APPROVE | 01 REQUEST USER ACTION | ALL BOTH INTERNAL AND EXTERNAL NOTIFICATION |
| 02 NEED APPROVE | 01 REQUEST USER ACTION | ALL BOTH INTERNAL AND EXTERNAL NOTIFICATION |
| 03 NEED TO MODIFY | 01 REQUEST USER ACTION | ALL BOTH INTERNAL AND EXTERNAL NOTIFICATION |
| 09 BACKEND PROCESSING | 02 SYSTEM PROCESSING | ALL BOTH INTERNAL AND EXTERNAL NOTIFICATION |
| 07 WORK FLOW ERROR | 04 ERROR PROCESSING | ALL BOTH INTERNAL AND EXTERNAL NOTIFICATION |
| 04 WORK FLOW COMPLETE | 05 COMPLETE WF | ALL BOTH INTERNAL AND EXTERNAL NOTIFICATION |
| 10 NEED PARALLEL PROCESSING | 06 PARALLEL PROCESSING | NON NO NOTIFICATION |
| 03 NEED TO MODIFY | 01 REQUEST USER ACTION | ALL BOTH INTERNAL AND EXTERNAL NOTIFICATION |
| 09 BACKEND PROCESSING | 02 SYSTEM PROCESSING | NON NO NOTIFICATION |
| 07 WORK FLOW ERROR | 04 ERROR PROCESSING | ALL BOTH INTERNAL AND EXTERNAL NOTIFICATION |
| 04 WORK FLOW COMPLETE | 05 COMPLETE WF | ALL BOTH INTERNAL AND EXTERNAL NOTIFICATION |
| 11 NEED ADMIN APPROVE | 01 REQUEST USER ACTION | ALL BOTH INTERNAL AND EXTERNAL NOTIFICATION |
| 16 WAIT FOR ADHOC APPROVER | 01 REQUEST USER ACTION | ALL BOTH INTERNAL AND EXTERNAL NOTIFICATION |

FROM FIG. 5B-2

| Assignment Plan (CRM) | Code | ID | | Business partner |
|---|---|---|---|---|
| ▽ ☐ IDES US | IDES US | O | 50000608 | 0000000032 |
|   ▷ ☐ US Sales & Service | Sales US | O | 50000609 | 0000000033 |
|   ▷ ☐ Purchasing West | PUR WEST | O | 50000709 | 0000000193 |
|   ▽ ☐ Production West | PROD WEST | O | 50000711 | 0000000195 |
|     ▷ 👤 Prof. Dr. Janine Hoover | Hoover | S | 50000760 | |
|     ▷ 👤 Dr. Maria Dolores | Dolores | S | 50005008 | |
|     ▽ ☐ Production West Atlanta | PROD W ATL | O | 50000712 | 0000000196 |
|       ▷ 👤 MBA William Saxton | Saxton | S | 50000966 | |
|       ▷ 👤 ITMANAGER | ITMANAGER | S | 50006208 | |
|       ▷ 👤 SWMANAGER | SWMANAGER | S | 50006210 | |
|       ▽ ☐ Atlanta technical Support | ATL TECHS | O | 50000713 | 0000000197 |
|         ▷ 👤 [Mike Miller] | Miller | S | 50000740 | |
|         ▷ 👤 William Smith | Smith | S | 50000742 | |
|         ▷ 👤 BBP Adminuser | Adminuser | S | 50000933 | |

FIG. 6B

| ORGANIZATION ID | ATTRIBUTE | OPTION | VALUE FROM | VALUE TO | COUNTERSIGNATURE |
|---|---|---|---|---|---|
| 50000713 | REQUEST AMOUNT | <= | 1000 | | NO |
| 50000712 | REQUEST AMOUNT | < | 5000 | | YES |
| 50000712 | CURRENT DATE | PERIOD | 20120101 | 20121231 | |
| 50000711 | | | | | NO |

EASY PROCESS MODELING PLATFORM

CLAIM OF PRIORITY

This application claims priority under 35 U.S.C. §119 to Chinese Patent Application No. 201110262652.9, filed Sep. 6, 2011, the entire disclosure of which is incorporated herein by reference.

TECHNICAL FIELD

The present disclosure relates to software, computer systems, and computer implemented methods for providing a generic process modeling framework for business process development and modification.

BACKGROUND

Business process management is a concept and technology used throughout various industries. Business process management has developed in parallel in two directions, process modeling and technology engineering. In both areas, various tools support both business users and technical users. Normally, business users abstract business logic for a particular business process, and provide that logic to technical developers to turn the logic into technical components and processes. In many situations, this method of building business processes is successful when the business user can provide the technical user with an accurate and specific process diagram, such as a Visio file. The technical user can understand the common nomenclature and illustrations within the diagram to create a specific technical model corresponding to the process within a business process design system.

Issues and problems occur when requirement or process changes are necessary or desired by the business users. Currently, changes require the business users or associated analysts to identify the appropriate changes to be made within a particular model, communicate those changes to the technical user, and subsequently, enable those new or updated features. Due to the frequency of changes, delayed project implementation and increased maintenance costs may occur. Additionally, the business and technical users associated with the original process may be unavailable, leaving one or more unfamiliar users responsible for the updates or modifications.

SUMMARY

The present disclosure describes methods, systems, and computer program products for generic process modeling. One method includes identifying a business process for execution, the business process defined by one or more process steps, identifying a process routing table associated with the identified business process, at least a portion of the process routing table including one or more entries defining a set of business process rules for the identified business process, identifying a particular entry in the process routing table associated with a current state of the identified business process; and performing at least one action defined by the identified particular entry in the process routing table. In some instances, at least one entry in the process routing table is associated with one of a plurality of process patterns, with each process pattern comprising a reusable, predefined operation.

While generally described as computer implemented software embodied on tangible media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 1 illustrates an example environment for implementing various features of a system providing a generic process modeling framework for business process development and modification.

FIG. 4 illustrates an example of several processes used in a generic workflow system, such as those described in the present disclosure.

FIGS. 5A and 5B-1, 5B-2 and 5B-3 illustrate examples of process routing tables used in a generic workflow system.

FIGS. 6A and 6B illustrate an example scenario associated with the use of the generic framework and its process routing table within a human capital management (HCM) application.

DETAILED DESCRIPTION

Figure 2:
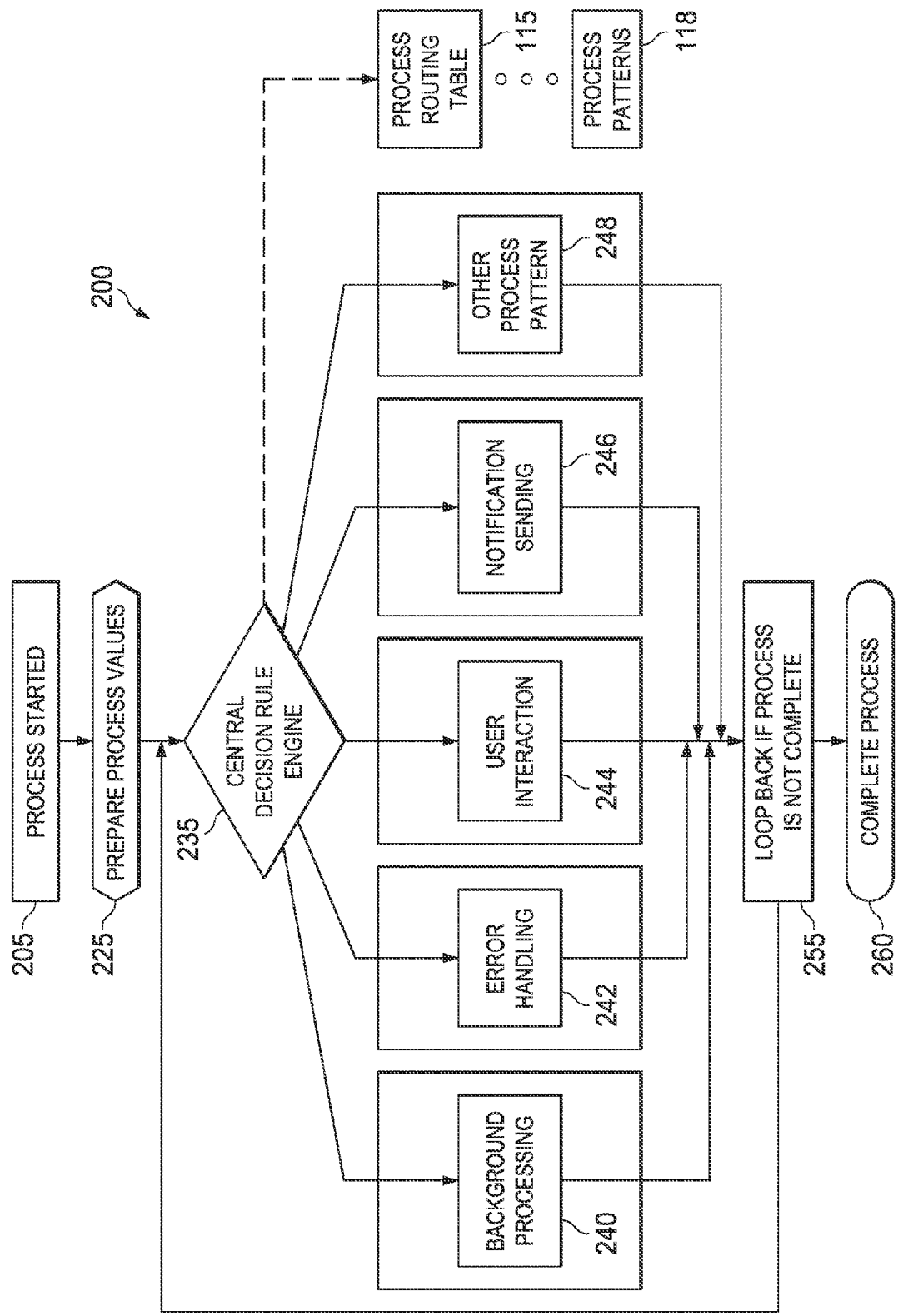
FIG. 2 illustrates an example of a rule-driven generic workflow template.

This disclosure generally relates to software, computer systems, and computer implemented methods for providing a generic process modeling framework for business process development and modification. Specifically, tools and methods for allowing business users to easily and consistently create and modify business processes, without involving a technical user, are described. Generally, the generic process modeling framework allows for frequent changes to business processes and immediate feedback on the results of those changes.

Prior solutions for developing or modifying process requirements require business users to design a business process in a modeling environment, provide the modeled business process to a technical user, and then have the technical user develop the necessary services and functionality to perform the functionality. Frequent modifications, communication issues, and other bottleneck points may cause the delay in implementation of the updates and modifications, causing business processes not to perform up to the specifications provided by the business user. In one example, such as in a customer relationship management (CRM) approval process, a marketing director may identify an approval process requirement for a campaign for products of LCD TVs stating that if the amount is less than $5,000, then a sales manager can approve, otherwise, a sales director must approve the campaign. The marketing director (the business user in this scenario) can provide these requirements to a workflow expert to generate the appropriate workflow. The workflow expert may then update a workflow template specific to the current process, and provide the template to a business process developer. The business process developer can then design the appropriate coding to meet the designed workflow for the process. Several issues occur with this solution. First, the time it takes to modify the process is not reasonable, requiring the availability of two or more users or employees to identify, design, and develop the changes. Further, implementation causes many efforts, including multiple checks between the users, to ensure that the correct logic is passed through the design process. Based on the multiple users, it may be easy for mistakes to occur, causing the final result to be different than what the business user had identified and hoped to achieve, such that issues may occur in the actual use of the business process.

Staying with the same example, the marketing director may also want to add a new approval process for camera products. The process may be similar to the LCD TV process, except there may be an additional approval layer when the amount is greater than $10,000. Even though the new camera process is similar to the previously designed LCD TV process, the marketing director may still need to work through both the workflow expert and the business process developer to implement the new conditions and modify the camera process.

The present disclosure provides tools to allow business users to build processes intuitively by providing a configuration via entries into a process routing table. In these solutions, no workflow experts are needed to model processes using a specific workflow technology, instead allowing business users to define one or more rules for a process within the process routing table, and allowing a generic rule engine to perform the logic in determining the proper actions to take when a process is initiated based on the logic defined within the process routing table by the business user. In doing so, development is made simpler, more straightforward, and can remove several layers of users from the development equation. In doing so, the business user can have increased control over the business process, which allows for quicker modifications when a change is identified.

Figures 1, 5B:
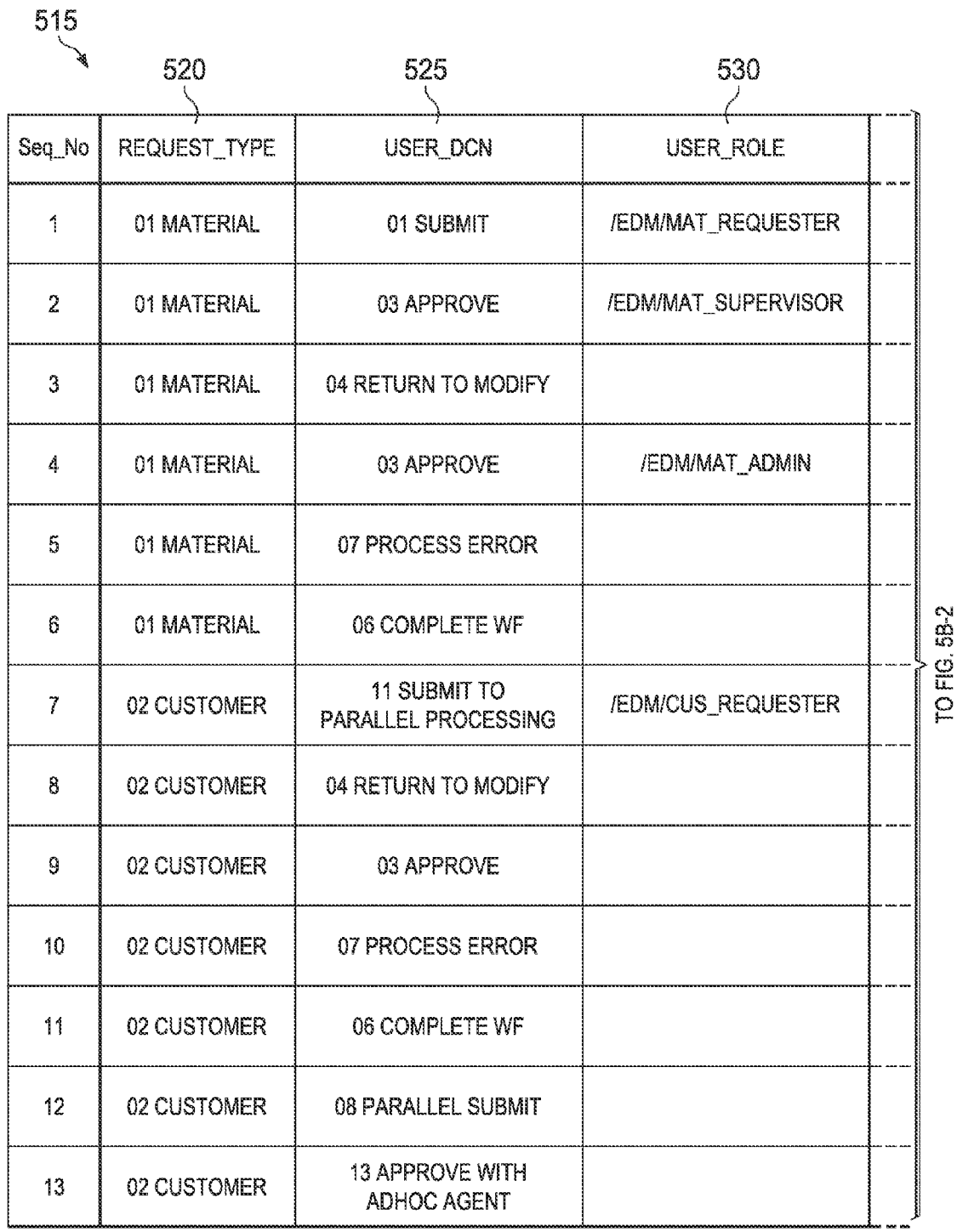

FIG. 1 illustrates an example environment 100 for implementing various features of a system providing a generic process modeling framework for business process development and modification that can allow business users to easily and quickly create and/or modify business processes without the need for traditional workflow experts and/or business process developers. The illustrated environment 100 includes, or is communicably coupled with, a generic process modeling workflow system 103, a client 145, and a mobile client 163. At least some of the components may communicate across or via network 142. In general, environment 100 depicts an example configuration of a system capable of performing at least a portion of the operations and solutions identified by the present disclosure. Specifically, the generic process modeling workflow system 103 provides a rule engine 130 that can interpret one or more rules associated with particular processes from one or more process routing tables 115. The process routing tables 115 store and define the logic for one or more processes. Users of client 145 and/or mobile client 163, as well as users at other clients or local to the generic process modeling workflow system 103, can access the process routing tables 115 and modify entries associated with a particular process, changing the underlying process in a relatively immediate fashion. The environment 100 is an example, and in alternative implementations, the elements illustrated in FIG. 1 may be included in or associated with different and/or additional servers, clients, mobile clients, networks, or locations other than those as shown. For example, one or more of the components illustrated within the generic process modeling workflow system 103 may be located in multiple or different servers, cloud-based networks, or other locations accessible to the generic process modeling workflow system 103 (e.g., either directly or indirectly via network 142).

In general, the generic process modeling workflow system 103 is any server that stores and executes a generic workflow template framework 127, which allows for the execution of one or more business processes via business application 124. For example, each generic process modeling workflow system 103 may be a Java 2 Platform, Enterprise Edition (J2EE)-compliant application server that includes Java technologies such as Enterprise JavaBeans (EJB), J2EE Connector Architecture (JCA), Java Messaging Service (JMS), Java Naming and Directory Interface (JNDI), and Java Database Connectivity (JDBC). In some instances, each generic process modeling workflow system 103 may store a plurality of various other applications, while in other instances, each generic process modeling workflow system 103 may be a dedicated server meant to store and execute a particular business application 124 and its related functionality via the generic workflow template framework 127. In some instances, the generic process modeling workflow system 103 may comprise a web server or be communicably coupled with a web server, where the generic workflow template framework 127 and/or the business applications 124 represent web-based (or web-accessible) applications accessed and executed through requests and interactions received via one or more clients 145 or mobile clients 163, executing one or more client applications 154 or mobile applications 172, respectively, operable to interact with the programmed tasks or operations of the generic workflow template framework 127 and/or the business application 124.

At a high level, the generic process modeling workflow system 103 comprises an electronic computing device operable to receive, transmit, process, store, or manage data and information associated with the environment 100. The generic process modeling workflow system 103 illustrated in FIG. 1 can be responsible for receiving application requests from one or more clients 145 and/or mobile clients 163 (as well as any other entity or system interacting with the generic process modeling workflow system 103, including desktop or other client systems), responding to the received requests by processing said requests in the generic workflow template framework 127 and/or the associated business application 124, and sending the appropriate responses from the generic workflow template framework 127 and/or the business application 124 back to the requesting client 145 and/or mobile client 163 or other requesting system. Both the generic workflow template framework 127 and/or the business application 124 may be able to process and respond to local requests from users locally accessing the generic process modeling workflow system 103. Accordingly, in addition to requests from the clients 145 or the mobile clients 163 illustrated in FIG. 1, requests associated with the generic workflow template framework 127 and/or the business application 124 may also be sent from internal users, external or third-party customers, and other associated business applications or business processes, as well as any other appropriate entities, individuals, systems, or computers. In some instances, the business application 124 and/or the generic workflow template framework 127 may be a web-based application executing functionality associated with a networked or cloud-based business process.

As used in the present disclosure, the term "computer" is intended to encompass any suitable processing device. For example, although FIG. 1 illustrates a single generic process modeling workflow system 103, environment 100 can be implemented using any number of servers, as well as computers other than servers, including a server pool. Indeed, the generic process modeling workflow system 103 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, the illustrated generic process modeling workflow system 103 may be adapted to execute any operating system, including Linux, UNIX, Windows, Mac OS, or any other suitable operating system.

In the illustrated implementation of FIG. 1, the generic process modeling workflow system 103 includes an interface 106, a processor 109, a memory 112, the business application 124, and the generic workflow template framework 127. In some instances, the generic process modeling workflow system 103 and its illustrated components may be separated into multiple components executing at different servers and/or systems. Thus, while illustrated as a single component in the example environment 100 of FIG. 1, alternative implementations may illustrate the generic process modeling workflow system 103 as comprising multiple parts or portions.

FIG. 1 depicts both a server-client environment, but could also represent a cloud computing network. Various other implementations of the illustrated environment 100 can be provided to allow for increased flexibility in the underlying system, including multiple generic workflow template framework 127 performing or executing one or more additional or alternative instances of the generic workflow template framework 127 and/or business application 124, as well as other associated or related applications, including those illustrated as included as part of the generic workflow template framework 127. In those instances, the different generic process modeling workflow systems 103 may communicate with each other via a cloud-based network or through the connections provided by network 142.

The interface 106 is used by the generic process modeling workflow system 103 to communicate with other systems in a client-server or other distributed environment (including within environment 100) connected to the network 142 (e.g., one of the clients 145, mobile clients 163, as well as other systems communicably coupled to the network 142). The interface 106 generally comprises logic encoded in software and/or hardware in a suitable combination and operable to communicate with the network 142. More specifically, the interface 106 may comprise software supporting one or more communication protocols associated with communications such that the network 142 or the interface's hardware is operable to communicate physical signals within and outside of the illustrated environment 100.

Generally, the generic process modeling workflow system 103 may be communicably coupled with a network 142 that facilitates wireless or wireline communications between the components of the environment 100 (i.e., between the generic process modeling workflow system 103 and one or more clients 145 and mobile clients 163), as well as with any other local or remote computer, such as additional clients, servers, or other devices communicably coupled to network 142, including those not illustrated in FIG. 1. In the illustrated environment, the network 142 is depicted as a single network, but may be comprised of more than one network without departing from the scope of this disclosure, so long as at least a portion of the network 142 may facilitate communications between senders and recipients. In some instances, one or more of the components associated with the generic process modeling workflow system 103 may be included within the network 142 as one or more cloud-based services or operations.

The network 142 may be all or a portion of an enterprise or secured network, while in another instance, at least a portion of the network 142 may represent a connection to the Internet. In the illustrated example, at least a portion of the network 142 includes a portion of a cellular or mobile data network or other network capable of relaying text and/or multimedia messages. In some instances, a portion of the network 142 may be a virtual private network (VPN). Further, all or a portion of the network 142 can comprise either a wireline or wireless link. Example wireless links may include 802.11a/b/g/n, 802.20, WiMax, and/or any other appropriate wireless link. In other words, the network 142 encompasses any internal or external network, networks, sub-network, or combination thereof operable to facilitate communications between various computing components inside and outside the illustrated environment 100. The network 142 may communicate, for example, Internet Protocol (IP) packets, Frame Relay frames, Asynchronous Transfer Mode (ATM) cells, voice, video, data, and other suitable information between network addresses. The network 142 may also include one or more local area networks (LANs), radio access networks (RANs), metropolitan area networks (MANs), wide area networks (WANs), all or a portion of the Internet, and/or any other communication system or systems at one or more locations.

As illustrated in FIG. 1, the generic process modeling workflow system 103 includes a processor 109. Although illustrated as a single processor 109 in the generic process modeling workflow system 103, two or more processors may be used in the generic process modeling workflow system 103 according to particular needs, desires, or particular embodiments of environment 100. The processor 109 may be a central processing unit (CPU), a blade, an application specific integrated circuit (ASIC), a field-programmable gate array (FPGA), or another suitable component. Generally, the processor 109 executes instructions and manipulates data to perform the operations of the generic process modeling workflow system 103 and, specifically, the functionality associated with the corresponding generic workflow template framework 127 and the business application 124. In one implementation, the server's processor 109 executes the functionality required to receive and respond to requests and instructions from the one or more clients 145 and/or mobile clients 163, as well as the functionality required to perform the operations of the associated generic workflow template framework 127 and business application 124.

Regardless of the particular implementation, "software" may include computer-readable instructions, firmware, wired or programmed hardware, or any combination thereof on a tangible and non-transitory medium operable when executed to perform at least the processes and operations described herein. Indeed, each software component may be fully or partially written or described in any appropriate computer language including C, C++, Java, Visual Basic, assembler, Perl, any suitable version of 4GL, as well as others. It will be understood that while portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components, as appropriate. In the illustrated environment 100, each processor 109 executes the corresponding generic workflow template framework 127 and business application 124 stored on the associated generic process modeling workflow system 103. In some instances, a particular generic process modeling workflow system 103 may be associated with the execution of two or more business applications 124, as well as one or more distributed applications executing across two or more generic process modeling workflow systems 103.

At a high level, the generic workflow template framework 127 is any application, program, module, process, or other software that may execute, change, delete, generate, or otherwise manage information associated with a particular generic process modeling workflow system 103. The generic workflow template framework 127, through its use of the corresponding rule engine 130 and the process routing table 115 (illustrated in memory 112) allows for users to easily create configuration-based business process logic to be performed in a business-related activity, in some instances, by the business application 124. Specifically, the generic workflow template framework 127 may operate in response to and in connection with one or more requests received from an associated client 145 and/or mobile client 163, as well as any other remote client. Additionally, the generic workflow template framework 127 may operate in response to and in connection with one or more requests received from a particular business application 124, including a business application associated with another generic process modeling workflow system 103 or other system. In some instances, the generic workflow template framework 127 may represent a web-based application accessed and executed by remote clients, including one or more clients 145 and/or mobile clients 163, via the network 142 (e.g., through the Internet, or via one or more cloud-based services associated with the generic workflow template 127). Further, while illustrated as internal to the generic process modeling workflow system 103, one or more processes associated with the generic workflow template framework 127 may be stored, referenced, or executed remotely. For example, a portion of the generic workflow template framework 127 may be a web service that is remotely called, while another portion of the generic workflow template framework 127 may be an interface object or agent bundled for processing at a remote system (not illustrated), client 145, or mobile client 163. Moreover, any or the entire generic workflow template framework 127 may be a child or sub-module of another software module or enterprise application (not illustrated) without departing from the scope of this disclosure. Still further, portions of the generic workflow template framework 127 may be executed or accessed by a user working directly at the generic process modeling workflow system 103, as well as remotely at a corresponding client 145, mobile client 163, or other client.

The generic workflow template framework 127 is illustrated as including a rule engine 130, an authorization framework 133, a process simulator module 136, and a content search module 139. The rule engine 130 is used to coordinate the one or more generically defined processes defined within the set of process definitions 121 (illustrated in memory 112). The primary function of the rule engine 130 is to decide, under given circumstances or based on a particular state, the proper result of a particular operation within the business process. The rule engine's 130 key function is to interpret the output of one process step to determine the appropriate next process step within the business process, as defined by the logic within the process routing table 115. Traditional process diagrams use rigid lines, loops, and forks to define the proper process flow, while the rule engine 130 uses a condition table (based on the entries of the process routing table 115) and a loop back function to provide sufficient controller functions for performing a particular business process. By defining the proper conditions within the process routing table 115, including the associated process patterns 118 to be performed based on the particular input, defining conditions and results into the process routing table 115 at design time provides a straightforward means of defining business processes. When a particular process is executed, the rule engine 130 examines the current condition and decides the next process step by comparing the output of the current step to the process routing table 115 entries. The rule engine 130 thus replaces the rigid process lines and requirements of the traditional business process, and provides great flexibility to business users to define and modify business processes without the assistance of workflow experts and/or technical users or developers. The generic workflow template framework 127 may also be associated with specific application programming interfaces (APIs) for business users and developers to use to access its functionality. Additionally, the generic workflow template framework 127 may be able to present the process routing table 115 or portions thereof in friendly and interactive user interfaces (UIs) in web pages, Extensible Markup Language (XML) files, Excel or other spreadsheet files or tables, database tables, as well as other suitable alternatives. Users at one of the clients 145 and/or the mobile clients 163 can thus directly modify the process routing table 115 via the rule engine 130 and/or the generic workflow template framework 127 using a browser or other suitable application at the client 145 or mobile client 163. This can eliminate the previous round-trip correspondence between the business user, the workflow expert, and the business process developer. Business users can provide a more precise rule configuration according to the abstract business scenario that they have identified. Business process developers, on the other hand, avoid having to understand the technical implementation of a particular business process and can instead become involved in the development tasks associated with the one or more process patterns 118 executed by the rule engine 130 as directed by the process routing table 115.

The one or more process patterns 118 execute the various functionality associated with the underlying business processes. Process patterns 118 are abstractions of business activities. Common patterns are not generally infinite, and can be generated and made available in the set of process patterns 118. Some common process patterns 118 may include user interaction patterns, computer background job patterns, error handling patterns, and notification patterns, among others. The process patterns 118 become concrete activity instances when they are passed parameters at runtime by the rule engine 130. A process definition 121 of the actions in a particular business process is created by using business logic and known process patterns 118 in the proper sequences. Process definitions 121 may be included within or associated with the process routing table 115, that, when the particular business process is to be executed, is controlled by the rule engine 130, which uses the proper parameters defined at design time by the business user to execute the business process. In some instances, individual process definitions 121 may be associated with a particular instance or separate version of the process routing table 115, which can be accessed directly to modify or update operations performed for a specific process. Using process patterns 118, instead of specific instances, reduces repetitive design, implementation, and testing work, and increases stability. In some instances, a unique or new process pattern 118 may be needed for a particular business process. The new process pattern 118 can be created by the business process developer, stored with the set of process patterns 118 in memory 112, and used by one or more business processes (or process definitions 121) to define a particular business task or set of tasks.

Combining the rule engine 130 and the process patterns 118 enables process coordination and execution. In an IT project initiation, business users can follow the traditional approach to define abstract business processes. At implementation time, no specific, rigid technical process template may be necessary. The business user and developers can work together to define and create process patterns 118 by reference of common patterns to be used in an environment and according to business needs. Within the process patterns 118, common parameters may be defined. Thus, business users are able to focus on the process routing table 115 to transform an abstract business process into defined rules for performing the business process. The integration of the rule engine 130 and the process patterns 118 creates a complete technical process to support the business processes. Using the methodology provided, one or several processes could be implemented with the same process template and technical code base. If any changes or new functions are later required, business users may only need to modify minor parts of the process routing table 115 to provide those modifications.

Returning to the generic workflow template framework 127, an authorization framework 133 is illustrated. The authorization framework 133 provides security to the generic workflow template framework 127 by requiring authenticating credentials prior to allowing business processes to be created and/or modified. For example, some systems may be associated with a role-based authorization system. In these systems, each user may be associated with a particular role. For each role, an authorization object may be associated therewith. In one example, the authorization object may be called "ProcessModelingAuthorizationObject." The authorization object may have several fields, including:

"AllowCreate"—indicating whether the user could model a new process;
"AllowModify"—indicating whether the user could modify an existing process;
"AllowDelete"—indicating whether the user could delete an existing process; and
"AllowView"—indicating whether the user could view the details of an existing process.

The values associated with the fields of a particular authorization object can be associated with the roles for which they apply. Different roles may be associated with different authorizations. For example, a marketing director may build a business process with a process type "Marketing Campaign Budget Application" used to control budget approval steps. The marketing director may generally be associated with an authorization object that allows him to update, delete, and view the process as needed. A sales manager underneath the marketing director may have the authorization to view the process, but may not be able to update or delete the process in some instances. To do so, two roles can be created: "Marketing Director" and "Sales Manager." The marketing director can be assigned the "Marketing Director" role, and the sales manager can be assigned the "Sales Manager" role. When accessing the generic workflow template framework 127, or when attempting to access the process routing table 115, the authorization framework 133 can match the user credentials to the user's particular role to determine the level of access to be provided. Other suitable types and methods of authorization level checking, authorization, and approval may be used in alternative implementations.

The generic workflow template framework 127 may also include a process simulator module 136. The process simulator module 136 is a tool that can be used to simulate a run of a particular process definition 121 (based on the process routing table 115) according to example input conditions provided by a user, allowing the results of the process to be shown without creating a process instance. The purpose of the tool is to let users input some process context data as conditions, with the process simulator module 136 showing the user the expected process result. The user can also be presented a portion of the process routing table 115 illustrating the rows or entries associated with the calculation, allowing the user to see the corresponding rows of the defined process. In one example, a process may be defined within the process routing table 115 to show that "if the amount>5000, sales manager to approve." If hundreds or thousands of process definition rows are available within the process routing table 115, it may not be possible or may be difficult to locate those portions quickly and efficiently. By using the process simulator module 136, the user could input context data stating the "amount=5001" and run the simulation. The process simulator module 136 can then perform the operations associated with that contextual data (i.e., "approver=sales manager"), as well as the rows or entries in the process routing table 115 associated with the determination. If the user desires a change to the process, the user can simply modify the fields of the process routing table 115 to change the logic behind the corresponding business process.

Additionally, the generic workflow template framework 127 may also include a content search module 139. The content search module 139 is a tool that provides business users with another means for locating particular process definition rows or entries within the process routing table 115. In some instances, business users may only need to provide an interested keyword for executing the search. A search engine or similar functionality may be associated with the process routing table 115, such that the search engine can locate the rows or entries within the process routing table 115 corresponding to the keywords or other search terms provided by the business user. For example, if the user wanted to locate the row "if the amount>5000, sales manager to approve," then keywords that could be used may include "amount" and "5000," among other possibilities. Implementation of the content search module 139 may be based on any suitable available search technology that can be associated with the contents of the process routing table 115. The process routing table 115 and/or one or more process definitions 121 may be indexed to allow for better and/or faster searching.

At a high level, the business application 124 is any application, program, module, process, or other software that may execute, change, delete, generate, or otherwise manage information according to the present disclosure, particularly in response to and in connection with one or more requests received from the illustrated clients 145, 163 and one or more client applications 154 and mobile applications 172. In certain cases, only one business application 124 may be located at or associated with the generic process modeling workflow system 103. In others, a plurality of related and/or unrelated business applications 124 may be stored there, or located across a plurality of other systems and/or servers comprising the generic process modeling workflow system 103 or other portions of the environment 100, as well. In certain cases, environment 100 may implement a composite business application. For example, portions of the composite application may be implemented as Enterprise Java Beans (EJBs) or design-time components, and may have the ability to generate run-time implementations into different platforms, such as J2EE (Java 2 Platform, Enterprise Edition), ABAP (Advanced Business Application Programming) objects, or Microsoft's .NET, among others. Additionally, the business application 124 may represent web-based applications accessed and executed by remote clients 145, 163, client application 154, or mobile application 172 via the network 142 (e.g., through the Internet). Further, while illustrated as internal to the generic process modeling workflow system 103, one or more processes associated with a particular business application 124 may be stored, referenced, or executed remotely. For example, a portion of a particular business application 124 may be a web service associated with the application that is remotely called, while another portion of the business application 124 may be an interface object or agent bundled for processing at a remote client 145, 163 (such as client application 154 or mobile application 172). Moreover, any or all of the business applications 124 may be a child, sub-module, or portion of another software module or enterprise application (not illustrated) without departing from the scope of this disclosure. Still further, portions of the business application 124 may be executed by a user or operator working directly, or locally, at the generic process modeling workflow system, as well as remotely at clients 145, 163. The business application 124 may be closely integrated with the process routing table 115 and the generic workflow template framework 127. In some instances, the business application 124 may be the application through which the various generically-defined business processes are executed, allowing different business and end users to perform the operations defined in the generic environment through the process routing table 115. In some instances, the business application 124 may execute business processes defined generically, as well as those defined in the traditional manner of a non-generic workflow. Further, execution of the business application 124 may allow users to access the portions of the generic workflow template framework 127 described herein, as well as the process routing table 115 and process patterns 118, among others. In some instances, the generic workflow template framework 127 may be a component of the business application 124, as well as part of the business application's inherent functionality.

The generic process modeling workflow system 103 also includes a memory 112 for storing data and program instructions. The memory 112 may include any memory or database module and may take the form of volatile or non-volatile memory including, without limitation, magnetic media, optical media, random access memory (RAM), read-only memory (ROM), removable media, or any other suitable local or remote memory component. The memory 112 may store various objects or data, including classes, frameworks, applications, backup data, business objects, jobs, web pages, web page templates, database tables, spreadsheets, process contexts, repositories storing services local to the generic process modeling workflow system 103, and any other appropriate information including any parameters, variables, algorithms, instructions, rules, constraints, or references thereto associated with the purposes of the system 103 and its generic workflow template framework 127 and/or its business application 124. In some implementations, including a cloud-based system, some or all of the memory 112 may be stored remotely from the generic process modeling workflow system 103, and communicably coupled to the system 103 for usage. As illustrated, memory 112 includes the process routing table 115, one or more process patterns 118, and one or more process definitions 121, each described above.

The illustrated environment of FIG. 1 also includes one or more clients 145. Each client 145 may be any computing device operable to connect to or communicate with the generic process modeling workflow system 103, either directly or via the network 142 using a wireline or wireless connection. Each client 145 includes an interface 148, a processor 151, a memory 157, a client application 154, and a graphical user interface (GUI) 160. In general, each client 145 comprises an electronic computer device operable to receive, transmit, process, and store any appropriate data associated with the environment 100 of FIG. 1. It will be understood that there may be any number of clients 145 associated with, or external to, environment 100. For example, while illustrated environment 100 includes one client 145, alternative implementations of environment 100 may include a single client or multiple clients communicably coupled to the generic process modeling workflow system 103, or any other number of clients suitable to the purposes of the environment 100. The interface 148, processor 151, and memory 157 may be generally similar to those described with regard to interface 106, processor 109, and memory 112 of the generic process modeling workflow system 103. Additionally, there may also be one or more additional clients external to the illustrated portion of environment 100 that are capable of interacting with the environment 100 via the network 142. Further, the term "client" and "user" may be used interchangeably as appropriate without departing from the scope of this disclosure. Moreover, while each client 145 is described in terms of being used by a single user, this disclosure contemplates that many users may use one computer, or that one user may use multiple computers. In some instances, client 145 may represent a general user, while in others, client 145 may represent an administrator or other support entity associated with the generic workflow template framework 127.

The GUI 160 associated with client 145 comprises a graphical user interface operable to, for example, allow the user of client 145 to interface with at least a portion of the platform for any suitable purpose, such as creating, preparing, requesting, modifying, or analyzing data, as well as viewing and accessing documents and files associated with various business transactions, including viewing, modifying, and executing business processes defined by the process routing table 115 and the associated process definitions 121. Generally, the GUI 160 provides the particular user with an efficient and user-friendly presentation of business data provided by or communicated within the system. The GUI 160 may comprise a plurality of customizable frames or views having interactive fields, pull-down lists, and buttons operated by the user. For example, GUI 160 may provide interactive elements that allow a user to enter or select elements of business process instances and business objects associated with the business application 124 or that allow a user to view and manipulate at least a portion of the process routing table 115, in GUI 160. Portions of the generic workflow template framework 127 and/or the business application 124 may be presented and accessible to the user through GUI 160, such as through a web browser or client application 154, for example. More generally, GUI 160 may also provide general interactive elements that allow a user to access and utilize various services and functions of client application 154. The GUI 160 is often configurable, supports a combination of tables and graphs (bar, line, pie, status dials, etc.), and is able to build real-time portals, where tabs are delineated by key characteristics (e.g. site or micro-site). Therefore, the GUI 160 contemplates any suitable graphical user interface, such as a combination of a generic web browser, intelligent engine, and command line interface (CLI) that processes information in the platform and efficiently presents the results to the user visually. In some instances, the client application 154 may be a remote module, agent, or portion of the business application 124 or generic workflow template framework 127, allowing users to access and modify data and values within the generic process modeling workflow system 103. In some instances, the client application 154 may be a web-based application, or even a web browser, that can perform tasks other than those associated with the generic process modeling workflow system 103. In some instances, the client application 154 may be used by a remote administrator to initialize or manage a new process as defined within the process routing table 115, as well as to design or update one or more process patterns 118.

As used in this disclosure, the clients 145 are intended to encompass personal computers, touch screen terminals, workstations, network computers, kiosks, wireless data ports, smart phones, personal data assistants (PDAs), one or more processors within these or other devices, or any other suitable processing devices. For example, each client 145 may comprise a computer that includes an input device, such as a keypad, touch screen, mouse, or other device that can accept user information, and an output device that conveys information associated with the operation of the generic process modeling workflow system 103, the business application 124, the generic workflow template framework 127, or the client 145 itself, including digital data, visual information, the client application 154, or the GUI 160. Both the input and output device may include fixed or removable storage media such as a magnetic storage media, CD-ROM, or other suitable media to both receive input from and provide output to users of client 145 through the display, namely, the GUI 160.

The mobile client 163 of FIG. 1 may be any mobile computer device operable to connect or communicate with the generic process modeling workflow system 103 and/or the network 142 using a wireless or wireline connection. In particular, the mobile client 163 may be embodied as a cell phone, personal digital assistant (PDA), smart phone, wireless messaging device, or other suitable type of mobile computing device. There may be any number of mobile clients 163 associated with environment 100 at any point in time. At a high level, each mobile client 163 can include a processor 169, a GUI 178, one or more mobile applications 172, a memory 175, and an interface 166. In general, the mobile client 163 comprises an electronic computer device operable to receive, transmit, process, and/or store any appropriate data associated with the one or more mobile applications 172. In one example, the mobile client 163 may be a smartphone that includes an input device, such as a keypad, touch screen, mouse, trackball, or other device that can accept information, and an output device that conveys information associated with the operation of the mobile client 163, including digital data, visual information, or the GUI 178. Both the input device and the output device may include fixed or removable storage media, such as a magnetic computer disk, CD-ROM, or other suitable media to both receive input from and provide output to users of the mobile client 163 through the display, namely, the GUI 178.

The interface 166 of the mobile client 163 may be similar to the interface 106 of the generic process modeling workflow system 103, in that it may comprise logic encoded in software and/or hardware in a suitable combination and operable to communicate with the network 142. More specifically, interface 166 may comprise software supporting one or more communication protocols such that the network 142 or hardware is operable to communicate physical signals to and from the mobile client 163. The interface 166 may be specially designed for mobile clients, and may allow for communications with data and cellular networks, as well as Wi-Fi connections.

Similarly, memory 175 of the mobile client 163 may include any memory or database module and may take the form of volatile or non-volatile memory including, without limitation, magnetic media, optical media, random access memory (RAM), read-only memory (ROM), removable media, or any other suitable local or remote memory component. For example, memory 175 may store mobile applications 163, backup data, parameters, cookies, variables, algorithms, instructions, rules, or references thereto.

In some instances, processor 169 may be similar to processor 109. In other instances, the processor 169 may be a processor designed specifically for use in mobile clients such as smartphones or PDAs. Further, although illustrated as a single processor 169, the processor 169 may be implemented as multiple processors in the mobile client 163. Regardless of the type and number, the processor 169 executes instructions and manipulates data to perform the operations of the mobile client 163, including operations to receive and process information from the generic process modeling workflow system 103 and/or the business application 124, access data within memory 175, and execute the mobile applications 172, as well as perform other operations associated with the mobile client 163.

The mobile applications 172 may represent versions of different business applications optimized for use on the mobile client 163, as well as a web browser or other suitable mobile application. In some instances, the mobile applications 172 may be web-based applications that are accessed via network 142, whereas in other instances, the mobile applications 172 may be mobile versions of one or more enterprise applications or suites. The mobile applications 172 may retrieve application-related information from a corresponding generic process modeling workflow system 103, or the applications 172 may access a locally cached set of process definitions or local version of a process routing table (not shown) stored on the mobile client 163, such as within memory 175. Using the mobile applications 172, users on the mobile clients 163 may be able to access the process routing table 115 to modify one or more processes while on the go. A mobile-compatible version of the process routing table 115 may be generated and presented to the mobile user via GUI 178, allowing interactive modifications to be made to the underlying business logic of the process routing table 115 on the mobile client.

The GUI 178 is a graphical user interface operable to allow the user of the mobile client 163 to interface with at least a portion of the system 100 for any suitable purpose, including to allow a user of the mobile client 163 to interact with one or more of the mobile applications 172, as well as any other mobile client 163 applications and/or functionality. The GUI 178 may be similar to the GUI 160 of the client 145, or it may be a mobile-based GUI 178 for use on the mobile client 163. Generally, the GUI 178 provides the mobile client 163 with an efficient and user-friendly presentation of data provided by or communicated within the system 100.

While FIG. 1 is described as containing or being associated with a plurality of components, not all components illustrated within the illustrated implementation of FIG. 1 may be utilized in each implementation of the present disclosure. Additionally, one or more of the components described herein may be located external to environment 100, while in other instances, certain components may be included within or as a portion of one or more of the other described components, as well as other components not described. Further, certain components illustrated in FIG. 1 may be combined with other components, as well as used for alternative or additional purposes, in addition to those purposes described herein.

FIG. 2 illustrates an example of a rule-driven generic workflow template 200. For clarity of presentation, the description that follows generally describes FIG. 2 in the context of environment 100 illustrated in FIG. 1. However, it will be understood that FIG. 2 may be implemented, for example, by any other suitable system, environment, or combination of systems and environments, as appropriate.

The rule-driven generic workflow template 200 comprises a decision tree, as illustrated, using the central decision rule engine 235 (analyzing the entries within the process routing table 115) to determine the correct results and next steps of a particular process. The template 200 may be understood in terms of a flowchart in some instances. At 205, a particular process is started. In some instances, the particular process may be associated with a business application (such as business application 124), with the particular process defined by a particular set of rules defined within the process routing table 115 and/or a particular process definition 121.

As further illustrated, the initial inputs are determined at 225, where the process values for the particular process are prepared. In some instances, the end user executing the particular process may define the initial inputs and provide them to business application or other runtime environment. Those inputs are then passed to the rule engine 130 at 235, and allow the rule engine 130 to determine how those inputs are to be processed.

As illustrated, the example workflow template 200 is associated with several process patterns 118, a background processing process pattern 240, an error handling process pattern 242, a user interaction process pattern 244, a notification sending process pattern 246, and other process patterns 248. These process patterns 118 are used to provide for the processing of the data or inputs of the rule engine 130 based on particular data flow and process flow conditions as defined in the process routing table 115. The illustrated generic workflow template 200 may generally define a plurality of processes, with the process routing table 115 maintaining the information differentiating each of the different processes associated with and defined within the generic process modeling workflow system 103. As input arrives to the rule engine 130, the rule engine 130 takes that input and determines the appropriate actions to take. For example, in some instances after an initial value is received, some background processing may be necessary, such that the rule engine 130 executes the background processing process pattern 240. Once the process pattern 240 completes its operations, a determination is made at 255 as to whether the overall process is complete. In some instances, this determination may also be made by the rule engine 130, while in others, an indication that the overall process is complete may be present after the execution of the corresponding process pattern 118. If the overall process is not complete, the process loops back to the rule engine's determination at 235 to identify the next operations to occur based on the current state of the overall process, as defined by the process routing table 115. If the overall process is determined to be complete, the process is completed at 260 and no additional determinations using the rule engine 130 are made in the current instantiation of the overall process.

Figure 3:
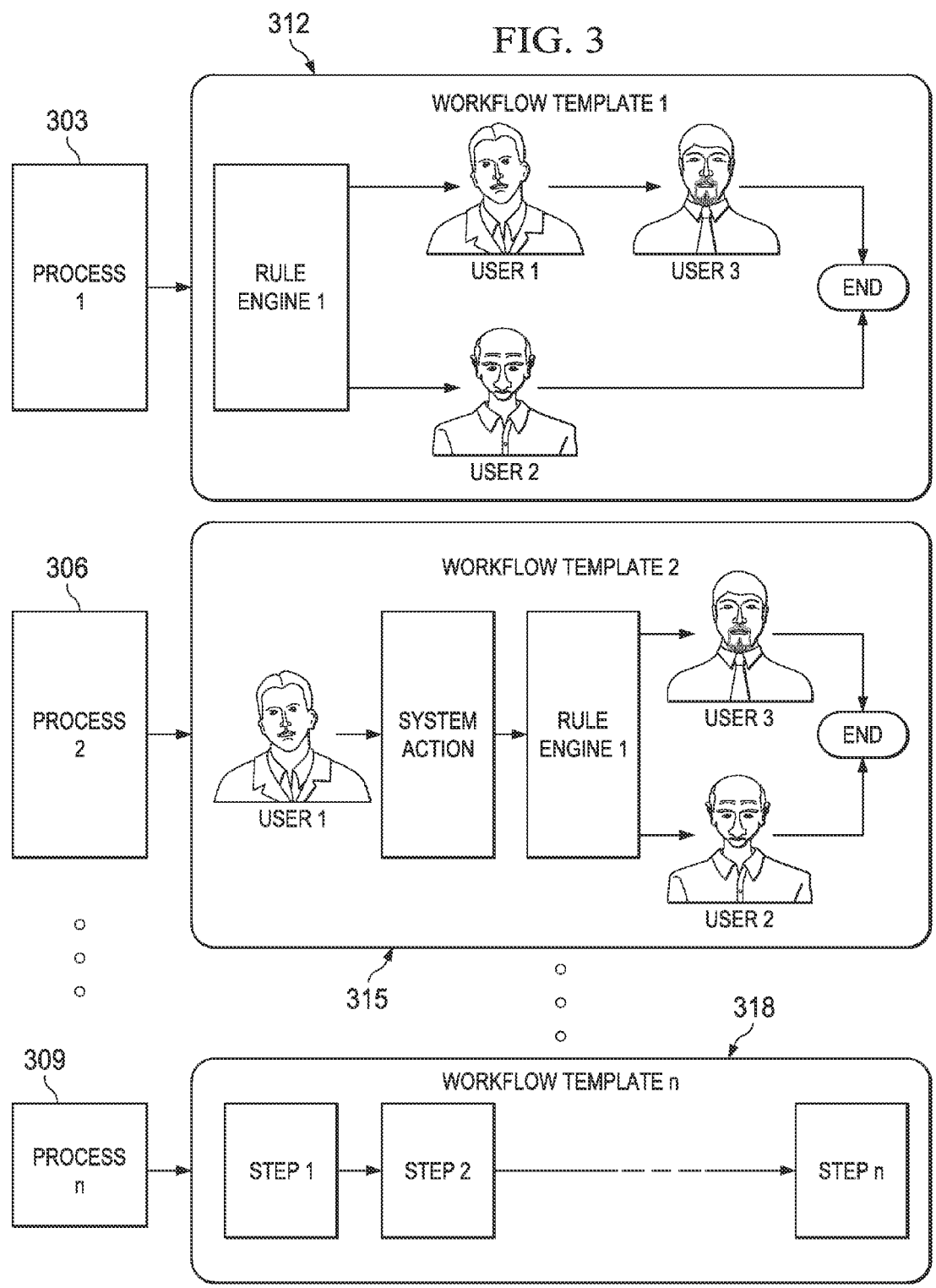
FIG. 3 illustrates an example of several traditional processes used in previous, non-generic systems.

FIG. 3 illustrates an example of several traditional processes used in previous, non-generic systems. Specifically, the workflow for each process 303, 306, 309 is defined differently, requiring a new and revised workflow template 312, 315, 318 and technical design of the logic behind each process 303, 306, 309. In these instances, at least two users are required to define a business process—one user to provide the logic and one to implement it. In most cases, a third user may be used to model the logic provided by a business user, with a technical user then developing the code based on the logic and defined model. Each process is different, and while portions of those processes may be reused, a new process must be individually defined according to the needs of the user.

Figures 4, 5A:
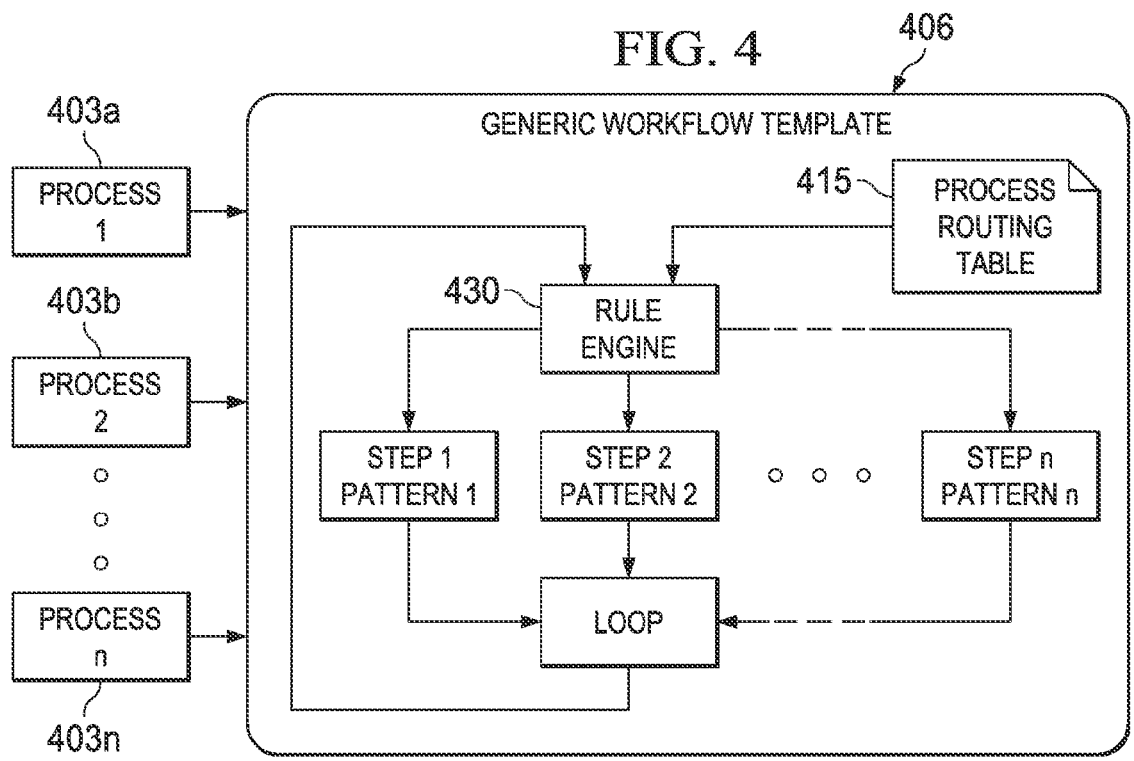

FIG. 4 corresponds to the illustrated example of FIG. 2, illustrating that each process developed in association with the generic process modeling workflow system 103 can be associated with the same generic workflow template 406. Specifically, each process 403a, 403b and 403n can be defined using the process routing table 415. No workflow design is necessary in designing these processes, as the particular process patterns 118 are identified within the process routing table 415, and acted upon by the corresponding rule engine 430 based on the corresponding input received in association with a process's execution. Different processes can be associated with different subsets of the process patterns, or can apply the process patterns in different orders or combinations. Further, the rules associated with when a particular process pattern is used may be different for different processes. In each event, however, the overall generic workflow template may be identical and used in each instance, allowing both the workflow developer and technical developer to be removed from the individual process definition activities.

FIGS. 5A and 5B-1, 5B-2 and 5B-3 illustrate examples of process routing tables that can be used in the present disclosure. FIG. 5A includes process routing table 505 illustrating an example set of decisions to be made on the approval requirements for actions involving both LCD TVs and cameras. Specifically, when the amount of LCD TVs is less than $5000, the sales manager can approve the transaction. However, when the amount is greater than or equal to $5000, then a sales director is required to approve the transaction. These values would be used by the rule engine to determine the proper individual to whom the approval action would be sent, and could be used in various situations to determine, on-the-fly, which individual or entity could approve certain transactions. Still further, as the logic associated with the determination is clear, business users wishing to modify the rules could access the process routing table 505 and its entries and modify them as necessary or desired. By doing so, the underlying logic of the application can be changed in an almost instantaneous manner, thereby providing the power of modification to business users having the appropriate authorization to modify the process routing table 505.

FIGS. 5B-1, 5B-2 and 5B-3 illustrate a more detailed process routing table 515, including the next actions to be performed in different situations based on the input to a particular rule. As illustrated, the process routing table 515 includes columns for the particular process being performed. In the illustrated example, the first three columns (520, 525, and 530) define the inbound conditions of the rule. When executing a process associated with the present process routing table, the system will receive information defining the inbound conditions (here, the REQUEST_TYPE, the USER_DCN, and the USER_ROLE), and use that information to determine which rule (or row) of the process routing table 515 to use. When, for instance, the request type 520 is "01 MATERIAL", the USER_DCN is "01 submit", and the USER_ROLE is "/EDM/MAT_REQUESTER", then the rule to be used corresponds to the first row in the illustrated table.

Similarly, the remaining columns (535, 540, 545, 550, and 555) define the result of the inbound conditions. Column 535 ("PROCESSOR_ROLE") defines the processor of the next process task after the initial inbound conditions are received. Column 540 ("DELEG_METHOD") is similar to column 535, with the difference that in column 535 a static user role is specified as to the processor of the next process task, while column 540 provides an indication of a particular program that will be executed at runtime to dynamically provide control or access to the next agent, processor, or user. Column 545 (SET_REQUEST_STAT) defines a setting for the state of the process for the next operation to be performed. Column 550 defines the process pattern associated with the current status or state of the process being performed, and column 555 defines the types of allowable notifications that can be performed. The process routing table 515 thereby defines one or more particular incoming states of the executing process (based on the combination of columns 520, 525, and 530) and uses that information, in connection with the rule engine, to define a particular process and its performance steps and boundaries (based on columns 535, 540, 545, 550, and 555). The rule defines the operations performed at a particular process state, as well as defines to what state the process should be placed once the operations for the particular process state are completed for use with the next task to be executed. Further, the rule defines the appropriate process patterns to use for processing the current state. As illustrated, the process routing table 515 is displayed similar to a spreadsheet. Users accessing the process routing table 515 and having the appropriate authorization could modify any of the illustrated steps by modifying the entries within the process routing table 515. No additional changes to the workflow of the process are necessary, as the particular flow of the process is determined by the operations and input conditions defined within a particular rule. Therefore, business users could easily modify the operations of a particular process by modifying the process routing table 515 according to their needs.

FIGS. 6A and 6B illustrate an example scenario associated with the use of the generic framework and its process routing table within a human capital management (HCM) application. FIG. 6A illustrates an example organizational unit 605 within the HCM application, with each entity and unit including or associated with an organization ID. The organization ID of the process routing table 630 of FIG. 6B uses the organization IDs 635 of the organization unit 605 to identify particular entities or users. In this case, the process defined within the process routing table 630 is an easy approval use case. The requirements of the process include: (1) an easy to build process created by the business manager; (2) an easy means of changing multiple levels of approvers; (3) integration with the HCM organizational unit; and (4) easy adjusting of approval conditions. In this process, several entries have been defined in the process routing table 630. First, the organizational ID "50000713" is represented, as well as organizational IDs "50000712" and "50000711." The ID "50000713" corresponds with the Atlanta Tech Support group, while the ID "50000712" corresponds with the Production West Atlanta group (higher in the organizational hierarchy than the Atlanta Tech Support Group), and ID "50000711" corresponds with Production West (in turn, relatively higher than the Production West Atlanta group). The modifications to the process routing table 630 are illustrated by the additions of the conditions for the entries labeled 665 associated with the organizational ID "50000713" representing Atlanta Technical Support. Prior to the modification of the process routing table 630, if the organizational ID was "50000713," then a determination was made as to the request amount to be approved. If the amount was greater than $5000, then a countersignature was required for any approval. In updating the process, however, the modification added a requirement for the attribute "Current Date" that an approval had a period between Jan. 1 and Dec. 31, 2012. This example illustrates the ability to change or modify the process routing table immediately, allowing for changes to be made to the underlying logic of a particular process without having to consult a workflow expert or technical expert.

Figure 7:
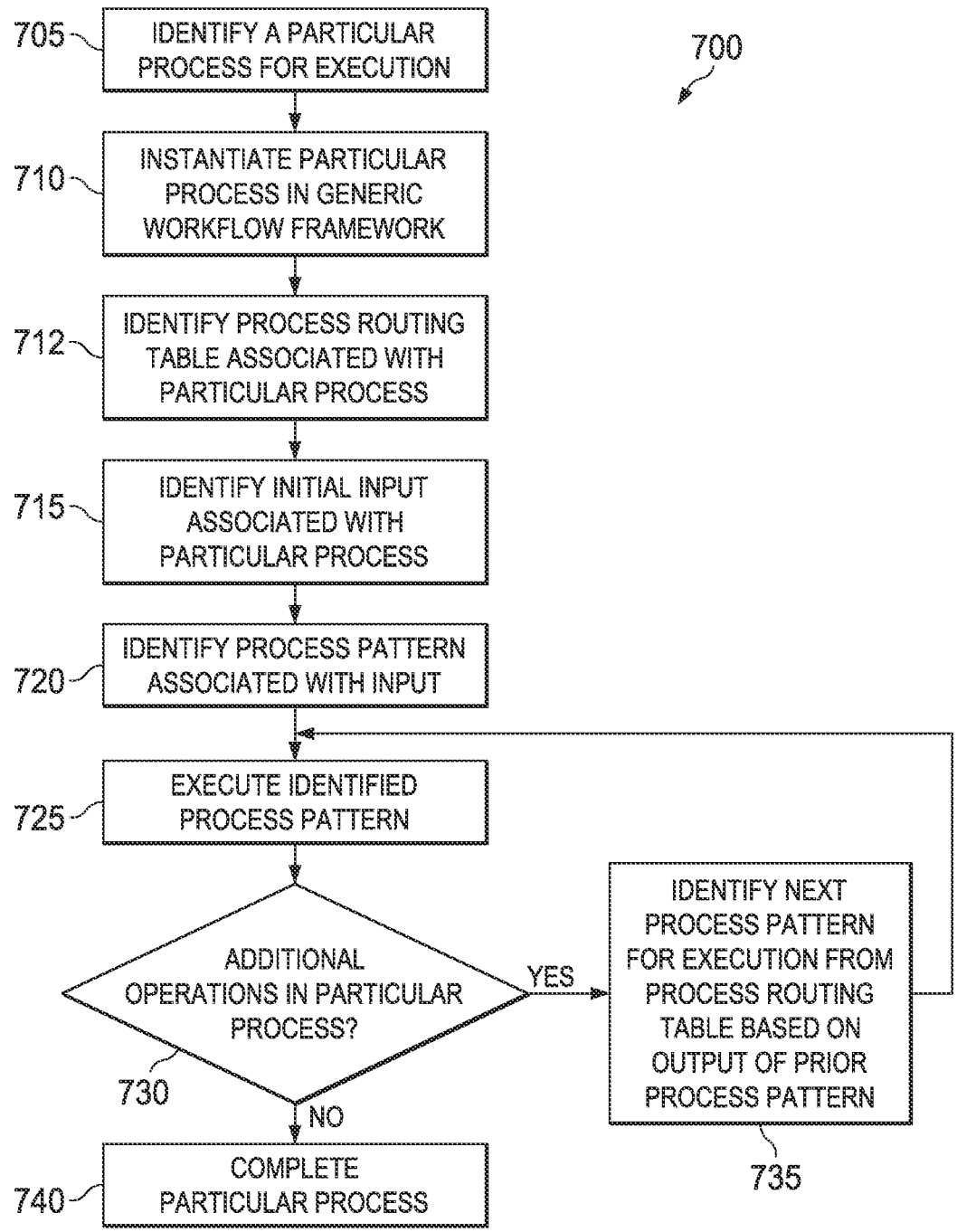
FIG. 7 illustrates a flowchart of an example method for executing a process defined within a process routing table and interpreted by a rule engine.

FIG. 7 is a flowchart of an example method 700 for executing of a process defined within a process routing table and interpreted by a rule engine as described in the present disclosure. For clarity of presentation, the description that follows generally describes method 700 in the context of environment 100 illustrated in FIG. 1. However, it will be understood that method 700 may be performed, for example, by any other suitable system, environment, or combination of systems and environments, as appropriate.

At 705, a particular process is selected or identified for execution. In some instances, the identification may be performed manually by a user, while in other instances, the process may be integrated with one or more business applications and identified automatically based on processing in those applications or events occurring therein or associated therewith. At 710, the identified particular process is instantiated in a generic workflow framework. In some instances, a generic placeholder of a process instance is instantiated, while in others, a process instance specific to the particular process is instantiated. At 712, a process routing table associated with the particular process is identified. The identified process routing table may include definitions associated with more than one process, such that identifying the process routing table further includes identifying a portion, or subset of entries, associated with the particular process.

At 715, a set of initial input associated with the particular process is identified. Again, the set of initial input may be manually defined by an end user or may be automatically defined based on information passed from other systems, processes, or business applications. At 720, a process pattern associated with the initial input is identified or determined. Determining or identifying the appropriate process pattern may be performed by a rule engine using the entries within the process routing table to determine the operations to be performed. Specifically, the initial input to the process instance is provided to the rule engine. The rule engine can read the entries in the process routing table to determine, based on the input, the appropriate process pattern to be performed. At 725, the identified process pattern is executed. In some instances, the execution of the process pattern may move the process into an updated state with new input, allowing the next process pattern, if necessary, to be identified. In some instances, the entries within the process routing table may define the next state to be provided once the correct entry associated with the input is identified. In some instances, the next process pattern to be executed may also be explicitly defined in the entries.

At 730, a determination is made as to whether additional operations are to be performed in the particular process. This determination is generally based on entries within the process routing table, identifying when and how the process is to end, or if an additional process pattern is to be performed. In some instances, the determination may be based on attributes associated with the previous entry used, with the entry identifying a particular process pattern step as the final step in the particular process. In other instances, the rule engine may identify the end of the particular process based on entries within the process routing table. If no additional operations are to be performed, then method 700 continues at 740 where the particular process is completed. If, however, additional operations are to be performed, then method 700 continues at 735.

At 735, the next process pattern for execution in the particular process is determined. In some instances, the rule engine may dynamically determine the next operation based on the output of the previous operation and the current state of the process, taken under consideration in combination with reference to the process routing table. In some instances, the previous operation may change the state to define that a particular process pattern is to be performed, allowing the rule engine to identify the correct next process pattern without considering the process routing table. The rule engine and the process routing table can define one or more operation transitions by causing actions to be performed by the particular process and modifying the current state of the particular process instance as operations are performed. In some instances, the output of the previous operation may be used to identify the next operation and associated process pattern to be performed. Once the current process pattern is identified, the identified process pattern is executed at 725, allowing the particular process to continue its execution.

Figure 8:
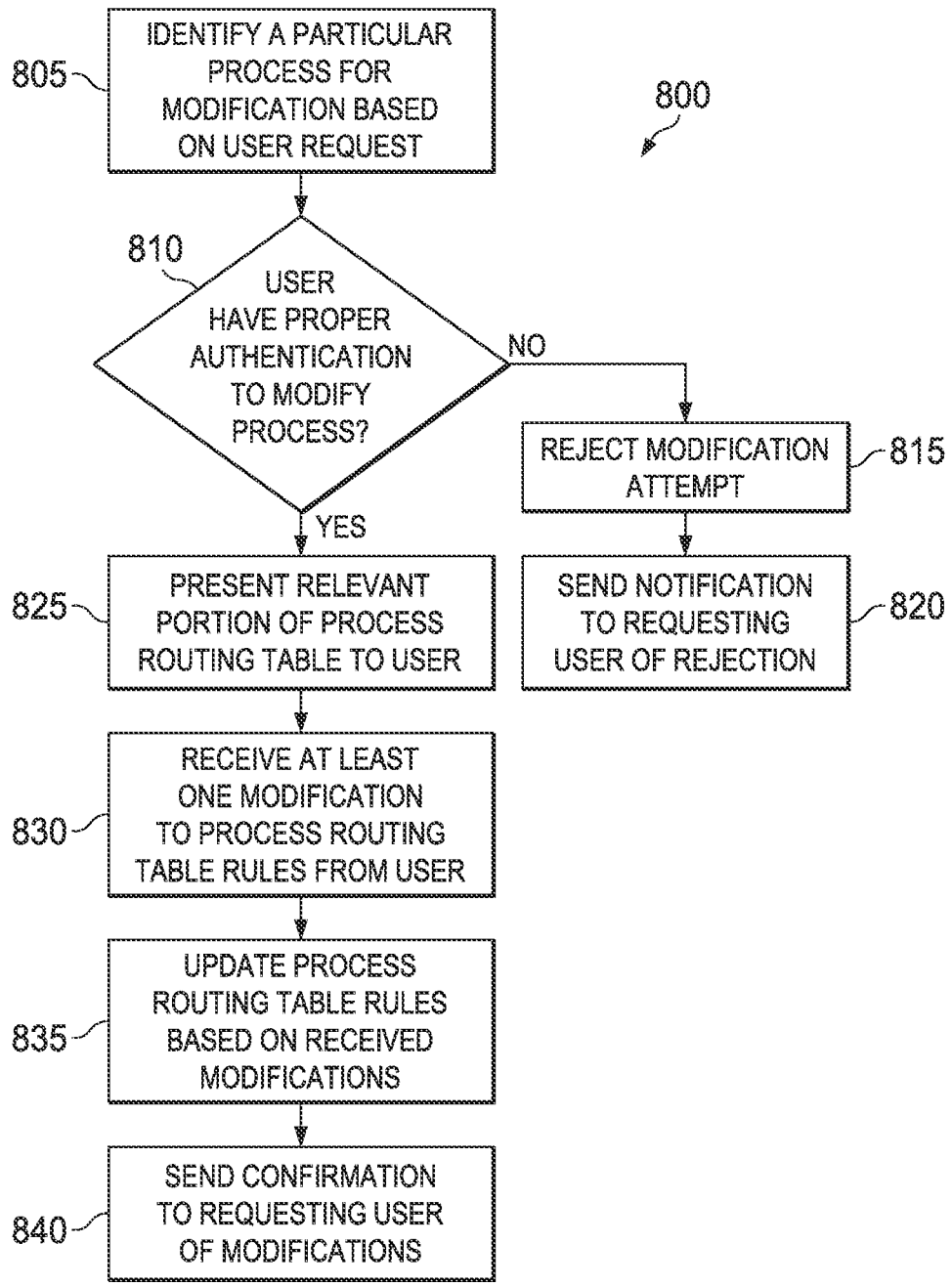
FIG. 8 illustrates a flowchart of an example method for modifying a process defined within a process routing table.

FIG. 8 is a flowchart of an example method 800 for modifying a process defined within a process routing table as described in the present disclosure. For clarity of presentation, the description that follows generally describes method 800 in the context of environment 100 illustrated in FIG. 1. However, it will be understood that method 800 may be performed, for example, by any other suitable system, environment, or combination of systems and environments, as appropriate.

At 805, a particular process is identified for modification based on a user request. In the current example, the user request may come from a business user, as well as any other type of user associated with a generic workflow template framework. At 810, a determination is made as to whether the requesting user has the proper authentication and privileges to modify the particular process. In some instances, the authorization to modify a particular process may be based on a user's role within an organization. Alternatively, each individual user may have specific permissions and authorizations associated with them and/or an account or username associated with the user. If the user does not have the proper permissions or authorization, method 800 continues at 815, where the modification attempt is rejected, and a rejection notification to the requesting user may be sent at 820. Alternatively, if the user does have adequate authentication, method 800 continues at 825.

At 825, a relevant portion of the process routing table associated with the particular process may be presented to the user via a user interface or GUI at the user's system or client. In some instances, the relevant portion of the process routing table may be an entire process routing table, while in other instances, the relevant portion may be a subset of the entire process routing table. The process routing table may be presented to the requesting user as an editable spreadsheet or interactive web page, either through a web browser or dedicated client application. At 830, at least one modification to presented relevant portion of the process routing table may be received from the user. At 835, the process routing table entries associated with the received modification are updated, thereby modifying the particular process and its operations. At 840, a confirmation is sent to the requesting user of the modification's success. The modification may be sent as a notification to the user interface of the requesting user, an email message, or any other suitable notification.

The preceding figures and accompanying description illustrate example processes and computer implementable techniques. But environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously, concurrently, and/or in different orders than as shown. Moreover, environment 100 may use processes with additional steps, fewer steps, and/or different steps, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method performed by one or more processors for generic process modeling, the method comprising the following operations:
   identifying, by the one or more processors, a business process for execution, the business process defined by one or more process steps;
   identifying, by the one or more processors, a process routing table associated with the identified business process, at least a portion of the process routing table including one or more entries defining a set of business process rules for the identified business process;
   identifying, by the one or more processors, a particular entry in the process routing table associated with a current state of the identified business process;
   performing, by the one or more processors, at least one action defined by the identified particular entry in the process routing table;
   changing the state of the identified business process to an updated state after performing the at least one action defined by the identified particular entry in the process routing table;
   determining whether the updated state of the identified business process is associated with completion of the identified business process;
   based on a determination that the updated state of the identified business process is not associated with completion of the identified business process:
      identifying a new particular entry in the process routing table associated with the updated state of the identified business process; and
      performing at least one action defined by the identified new particular entry in the process routing table; and
   based on a determination that the updated state of the identified business process is associated with completion of the identified business process, completing the identified business process.

2. The method of claim 1, wherein at least one particular entry in the process routing table is associated with one of a plurality of process patterns, each process pattern comprising a reusable, predefined operation.

3. The method of claim 2, wherein the at least one action defined by the identified particular entry in the process routing table is a particular process pattern.

4. The method of claim 1, wherein the process routing table comprises a table of rows and columns, each row defining an individual rule associated with a particular business process.

5. The method of claim 4, wherein the process routing table comprises at least one of the following: a database table, a spreadsheet table, or an XML file.

6. The method of claim 1, wherein the process routing table comprises an editable table.

7. The method of claim 6, the method further comprising the following operations:
   receiving a request from a user to edit the process routing table;
   determining whether the requesting user is authorized to modify the process routing table;
   based on a determination that the requesting user is authorized to modify the process routing table, presenting an editable version of the process routing table to the requesting user via a user interface; and
   updating the process routing table based on at least one modification received from the requesting user via the user interface.

8. The method of claim 7, where the requesting user is associated with a mobile device, wherein presenting the editable version of the process routing table to the requesting user via the user interface comprises presenting the editable version of the process routing table to the requesting user via a user interface of the mobile device.

9. The method of claim 7, further comprising, based on a determination that the requesting user is unauthorized to modify the process routing table, presenting a rejection notification to the requesting user via the user interface.

10. The method of claim 1, wherein identifying the process routing table associated with the identified business process and identifying the particular entry in the process routing table associated with the current state of the identified business process are performed by a central rule engine.

11. A computer program product for generic process modeling, the computer program product comprising computer readable instructions embodied on tangible, non-transitory media, the instructions operable when executed to:
   identify a business process for execution, the business process defined by one or more process steps;
   identify a process routing table associated with the identified business process, at least a portion of the process routing table including one or more entries defining a set of business process rules for the identified business process;
   identify a particular entry in the process routing table associated with a current state of the identified business process;
   perform at least one action defined by the identified particular entry in the process routing table;
   chance the state of the identified business process to an updated state after performing the at least one action defined by the identified particular entry in the process routine table;
   determine whether the updated state of the identified business process is associated with completion of the identified business process;
   based on a determination that the updated state of the identified business process is not associated with completion of the identified business process, identify a new particular entry in the process routine table associated with the updated state of the identified business process; and
   based on a determination that the updated state of the identified business process is associated with completion of the identified business process, complete the identified business process.

12. The product of claim 11, wherein at least one particular entry in the process routing table is associated with one of a plurality of process patterns, each process pattern comprising a reusable, predefined operation.

13. The product of claim 12, wherein the at least one action defined by the identified particular entry in the process routing table is a particular process pattern.

14. The product of claim 11, wherein the process routing table comprises a table of rows and columns, each row defining an individual rule associated with a particular business process.

15. The product of claim 14, wherein the process routing table comprises at least one of the following: a database table, a spreadsheet table, or an XML file.

16. The product of claim 11, wherein the process routing table comprises an editable table.

17. The product of claim 16, the instructions further operable when executed to:
   receive a request from a user to edit the process routing table;
   determine whether the requesting user is authorized to modify the process routing table;
   based on a determination that the requesting user is authorized to modify the process routing table, present an editable version of the process routing table to the requesting user via a user interface; and
   update the process routing table based on at least one modification received from the requesting user via the user interface.

18. The product of claim 11, wherein identifying the process routing table associated with the identified business process and identifying the particular entry in the process routing table associated with the current state of the identified business process are performed by a central rule engine.

19. A system comprising:
   one or more computers; and
   a tangible, non-transitory computer-readable medium coupled to the one or more computers having instructions stored thereon which, when executed by the one or more computers, cause the one or more computers to perform operations comprising:
      identifying a business process for execution, the business process defined by one or more process steps;
      identifying a process routing table associated with the identified business process, at least a portion of the process routing table including one or more entries defining a set of business process rules for the identified business process;
      identifying a particular entry in the process routing table associated with a current state of the identified business process;
      performing at least one action defined by the identified particular entry in the process routing table;
      change the state of the identified business process to an updated state after performing the at least one action defined by the identified particular entry in the process routing table;
      determine whether the updated state of the identified business process is associated with completion of the identified business process;
      based on a determination that the updated state of the identified business process is not associated with completion of the identified business process identify a new particular entry in the process routing table associated with the updated state of the identified business process; and based on a determination that the updated state of the identified business process is associated with completion of the identified business process, complete the identified business process.

* * * * *